United States Patent Office 3,303,070

Patented Feb. 7, 1967

3,303,070

SIMULTANEOUS DOUBLE DIFFUSION PROCESS

Paul F. Schmidt and Harold F. John, Pittsburgh, Pa., assignors to Westinghouse Electric Corporation, Pittsburgh, Pa., a corporation of Pennsylvania No Drawing. Filed Apr. 22, 1964, Ser. No. 361,865
5 Claims. (Cl. 148—187)

This invention relates to the simultaneous formation of a plurality of different functional zones in a body of semiconductive material.

It is a primary object of the present invention to provide a process by which a semiconductive substrate is provided with at least two zones of different conductivity type by a single diffusion process.

Still another object of the invention is a novel method to provide the simultaneous diffusion of phosphorus and aluminum into a body of semiconductive silicon to produce deep junctions therein.

Other objects will be apparent from time to time in the following detailed discussion and description.

Oxide films have heretofore been provided on the surfaces of semiconductive silicon by an anodization process. Where anodization is carried out in an electrolyte comprising up to about 15 volume percent of pyrophosphoric acid and the remainder tetrahydrofurfural alcohol, there results a sound oxide film containing up to about 23 weight percent phosphorus (as $P_2O_5$), or a concentration of phosphorus of up to about $4\times10^{21}$ atoms per cc. of the oxide. With n-type silicon as the semiconductive material, that doped oxide can be produced upon illuminating the silicon. The resulting phosphorus doped oxide constitutes a diffusion source in view of the phosphorus concentration. However, on n-type material, it is useful only for producing $n^+$ or n-type regions.

We have discovered that advantage can be taken of such a phosphorus diffusion source to produce useful semiconductive devices such, for example, as npn transistors. In accordance with our discoveries a semiconductive material such a n-type silicon that has a phosphorus doped oxide thereon is subjected to diffusion conditions in the presence of an atmosphere of aluminum. The latter element will penetrate the oxide layer and diffuse into the bulk of the semiconductor simultaneously with diffusion of phosphorus from the oxide. The aluminum diffuses so much more rapidly, in the bulk, than the phosphorus that npn distribution is readily achieved.

The process of this invention can be practiced without regard to the method by which the phosphorus rich oxide is provided on the semiconductor, for example, it can be provided by vacuum deposition techniques, pyrolytic methods and the like. However, a particularly satisfactory method of providing such doped oxide films is by anodization of n-type silicon in an electrolyte comprising, by way of example, about one to 15 volume percent of pyrophosphoric acid and the remainder tetrahydrofurfural alcohol. By pyrophosphoric acid we mean a mixture of phosphoric acids containing about 78 weight percent $P_2O_5$. One convenient method of providing that acid employs commerical 105 percent phosphoric acid, which contains about 42 percent pyrophosphoric acid. The density of the acid is measured and from that measurement there is calculated the amount of water that must be removed to increase the pyrophosphoric content thereof to the maximum of about 49 percent. Then the water is boiled from the 105 percent acid and is condensed. When the predetermined amount of water is collected, the process is halted. Of course other procedures may also be employed.

The semiconductor, for example a slice of n-type silicon of about 2 to 15 mils or more in thickness and having a resistivity of at least one ohm-cm., and preferably 5 to 50 ohm-cm. or more, is contacted with pyrophosphoric acid on the surface whereon the anodic oxide is to be grown. A platinum electrode is placed in contact with that electrolyte. The electric lead to the slice of silicon may be either an ohmic contact, such as the low work function metals aluminum or zinc evaporated on to the surface of the silicon, or it may be another electrolyte contact, for instance pyrophosphoric acid that is electrically insulated from the electrolyte in contact with the silicon surface to be anodized. In this latter practice platinum electrodes are placed in each of the two electrolyte compartments and are connected to a power source to complete the circuit. The surface of the silicon facing the negative platinum electrode in any practice will grow an anodic surface oxide under bias. With light being projected through the electrolyte to the silicon surface and a bias applied to the electrodes of 5 to 200 volts, doped oxide films of a thickness corresponding to the applied bias are readily grown, for example 1000 angstroms or more. Blue light (4700 angstroms) is preferred for best geometry control and its intensity should provide enough photons for the silicon to be oxidized. Excess light would reduce the definition of the pattern by producing an excess of holes which can diffuse sideways About 4 to 80 photons of light are used per atom of silicon being oxidized. Of course other methods of providing phosphorus containing oxide films can as well be used. However provided, the phosphorus doped oxide films act as diffusion sources for phosphorus.

In the practice of the present invention, the anodized and cleaned specimen is placed in a diffusion furnace provided with an atmosphere of aluminum. A quartz tube containing the silicon is inserted in a diffusion furnace and the silicon can be heated with an RF heater or any other heater desired that is capable of achieving the diffusion temperatures of about 1000° to 1250° C., and preferably about 1150° to 1200° C. While any method of providing aluminum can be practiced, it is convenient to place small pieces of metallic aluminum in the furnace on both sides of the anodized silicon being treated. Depending on the diffusion profile in the structure desired, the aluminum may be subjected to the same temperature as the silicon or to a different temperature. The furnace can also be provided with an atmosphere of noble gas, for example argon or the like, or other gas that does not introduce complications into the diffusion process.

It takes some time for aluminum to penetrate an $SiO_2$ layer, but once it is within the silicon bulk its diffusion is rapid and it quickly overtakes and passes the diffusing phosphorus. Generally the diffusion conditions are maintained for about 5 to 50 hours or more depending, as will be appreciated by those skilled in the art, on the oxide thickness and composition, the characteristics of the semiconductive substrate, the temperature employed and like considerations.

The invention will be described further in conjunction with the following examples in which the details are given by way of illustration and not by way of limitation.

EXAMPLE I

A slice of n-type silicon having dimensions of $1\times2$ cm., a resistivity of 20 ohm-cm., and an oxide layer thereon 300 angstroms thick and containing phosphorus in a concentration of about $2\times10^{19}$ atoms per cc. was used. This was placed in a furnace containing argon and was heated to a temperature of about 1175° C. Pieces of aluminum were placed on either side of the silicon slice to provide an aluminum vapor. These conditions were maintained for 31 hours, whereupon the specimen was removed and studied. It was found that an $n^+/pn$ junction was produced 17 microns from the surface and an $n^+p/n$ junction was at 41 microns. The resulting structure can be useful as a power switch, having been tested as such but without a heat sink.

EXAMPLE II

In another run 100 ohm-cm. n-type silicon was used. This had been anodized in $H_4P_2O_7$-tetrahydrofurfural alcohol to 60 volts. It was then subjected to a diffusion process as given in Example I for 21 hours. The argon pressure was 700 mm. of Hg. In several runs with the same starting material and diffusion conditions (1175° C.), the $n^+/pn$ junction was uniformly found at a depth of 13 microns while the $n^+p/n$ junctions were at 38 microns deep.

Numerous other runs were made with other phosphorus containing anodized specimens with uniformly satisfactory results. It is thereby evident that the process of this invention is uniquely effective in permitting the formation of npn devices with deeply diffused junctions in a highly efficient manner.

The invention has been described with respect to specific conditions, materials and the like. However, it should be evident that the invention is not to be unnecessarily limited thereby, and substitutions, changes and the like can be made without departing from its scope. For example, the invention can as readily be practiced, and is at least of equal importance, with n-type sources on p-type semiconductive material, especially for the preparation of certain types of transistors. Furthermore, localized junctions can be provided with the invention, for example where localized sources are developed, as by geometry control, and then p-type regions produced by the aluminum will separate the n-type regions from one another. In addition, it should be evident that semiconductors other than silicon, for Example III–V compounds, can be similarly used. All percentages given are by weight unless otherwise stated or apparent.

We claim:

1. A method of simultaneous double diffusion comprising heating at an elevated temperature a semiconductive member having on at least part of one major surface thereof a phosphorus-containing layer of silicon oxide, said phosphorus containing oxide layer having a thickness of about 1000 A., heating aluminum in the presence of the heated semiconductive member to provide a vapor of aluminum in contact with the layer of silicon oxide on the semiconductive member, and continuing those conditions of heating whereby the aluminum diffuses through the oxide coating and the phosphorus diffuses from the oxide coating into the bulk of the semiconductive member said aluminum diffusing to a greater depth in said semiconductive member than said phosphorus.

2. A method comprising heating at an elevated temperature semiconductive n-type silicon having on one major surface a phosphorus-containing layer of silicon oxide, said phopshorus containing oxide layer having a thickness of about 1000 A., heating aluminum in the presence of the heated silicon to provide a vapor pressure of aluminum in contact with the layer of silicon oxide on the semiconductive silicon, and maintaining those conditions of heating whereby the aluminum diffuses through the oxide coating and the phosphorus diffuses from the silicon oxide into the wafer of semiconductive silicon said aluminum diffusing to a greater depth in said silicon than said phosphorus.

3. A method in accordance with claim 2 in which the heating is continued sufficiently to diffuse the aluminum through and beyond the portion of the wafer of semiconductive silicon into which phosphorus has diffused.

4. A method of preparing npn semiconductive silicon comprising providing semiconductive silicon of n type semiconductivity with a phosphorus-containing silicon oxide layer having a thickness of about 1000 A., then placing the resulting body of semiconductive silicon and metallic aluminum in a controlled atmosphere furnace, heating the silicon and aluminum therein to a temperature sufficient to diffuse phosphorus from the layer into the body of silicon and aluminum through the oxide and into the body of silicon and maintaining those conditions until aluminum diffuses beyond the portion of the wafer into which phosphorus diffuses.

5. A method in accordance with claim 4 in which the semiconductive silicon and the aluminum are heated to a temperature of about 1000° to 1250° C.

References Cited by the Examiner

UNITED STATES PATENTS

| | | | |
|---|---|---|---|
| 2,725,315 | 11/1955 | Fuller | 148—191 X |
| 2,974,073 | 3/1961 | Armstrong | 148—188 |
| 3,154,838 | 11/1964 | Bullough | 148—186 X |
| 3,183,129 | 5/1965 | Tripp | 148—186 |
| 3,200,019 | 8/1965 | Scott | 148—188 |
| 3,235,419 | 2/1966 | Beale | 148—178 |

HYLAND BIZOT, *Primary Examiner.*